UNITED STATES PATENT OFFICE.

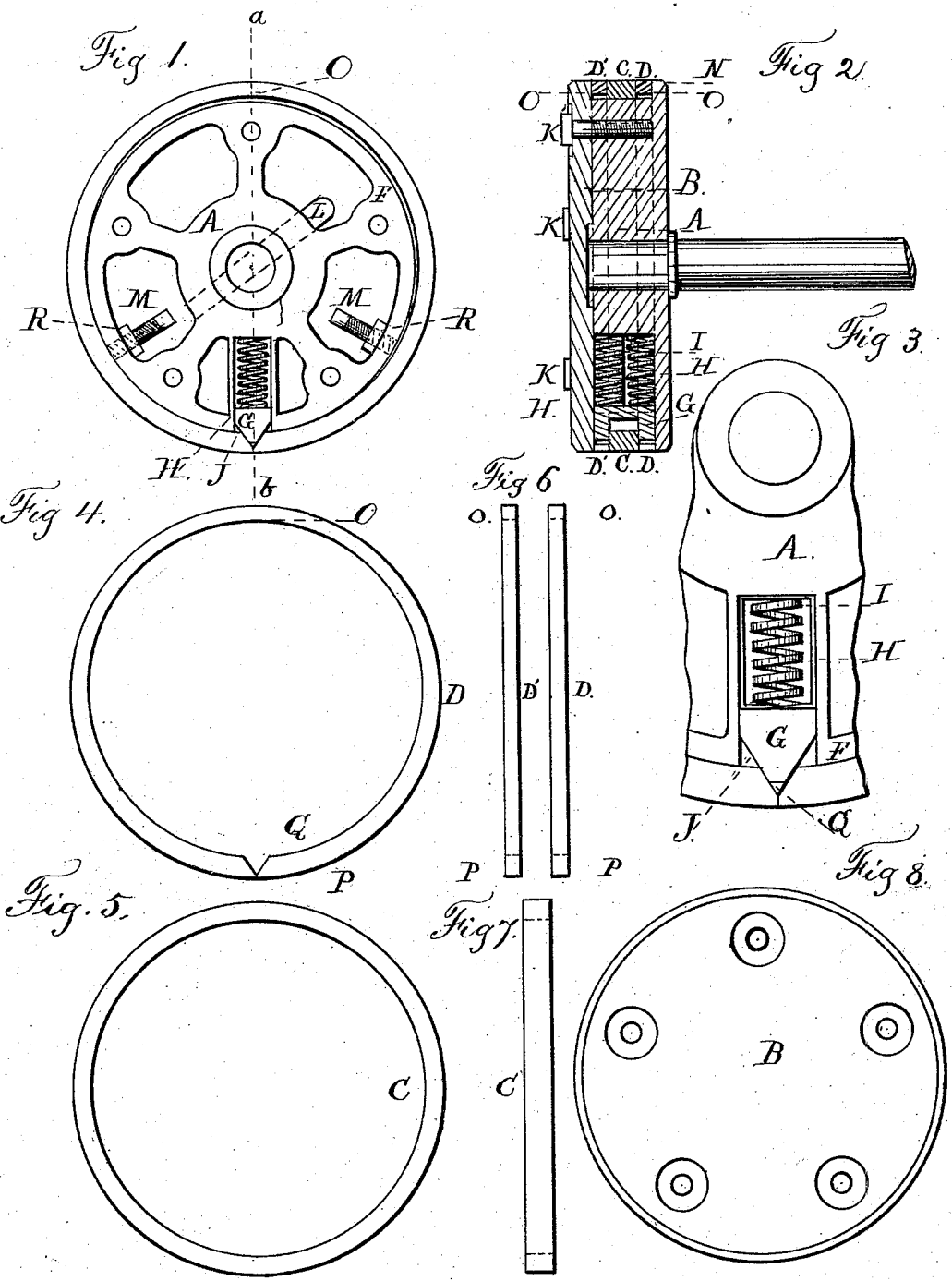

HENRY WALKER, OF HANNIBAL, MISSOURI.

IMPROVEMENT IN PISTON-PACKING.

Specification forming part of Letters Patent No. 194,746, dated August 28, 1877; application filed August 18, 1877.

*To all whom it may concern:*

Be it known that I, HENRY WALKER, of Hannibal, Missouri, have invented Improvements in the Mode of Packing Pistons in Steam and other Cylinders, of which the following is a specification:

My invention relates to piston-packing to prevent the flow of fluids or gases from one side to the other of the piston in a cylinder, and belongs to the class known as elastic-ring packing where the rings surround the piston-head in a proper groove, and expand by their own or added elasticity, to compensate for wear.

Heretofore it has been the custom to adjust the piston centrally in its cylinder by means of the same screws which are used to set out the packing-rings, where the elasticity is interposed between the ends of these set-screws and the inner surface of the packing-rings, and to set out the lower ones to give sufficient spring-power to sustain the weight of the piston, leaving the upper ones less strained. These springs and screws perform two offices—that of centering the piston in its cylinder, and of expanding the packing-rings to prevent leakage. The springs must on this account be stronger or more stiff than is necessary merely to expand the packing-rings, as they have to carry the weight of the piston also.

The object of my invention is to remedy this difficulty, and at the same time provide a simpler method of expanding packing-rings on a piston, which shall be self-adjusting to the wear by means of elasticity; and also to center the piston in its cylinder by means of set-screws bearing on or against an independent and non-elastic ring, which rests on the bottom of the cylinder.

To accomplish this my invention consists in the use of the usual piston-head surrounded between the follower and flange of said piston-head by three rings, the two end rings, respectively, being turned out eccentrically, and cut through at the lower and thicker portion of their circumference, so that they will spring apart. The intermediate ring is solid, and of the same diameter as the piston flange and follower, and is intended to fit the cylinder. The inner diameter of this ring nearly fits the circumference of the piston-head between the flange and follower, while the two eccentric split packing-rings, because they are bored out eccentrically, fill the space between this piston-head circumference and the cylinder at its bottom surface, but at its top they are thinner, and do not fill the whole space. Through the circumference of the piston-head are screwed, near the bottom, two set-screws, which, when screwed out to adjust the piston-head centrally in its cylinder, bear against the solid central ring. As this ring wears, these screws are set out farther to readjust the piston-head in the cylinder. The packing-rings are provided with springs and wedges, which, by means of the taper, act circumferentially between their ends at the point where they are split, and continually exert a proper pressure to keep them against the surface of the cylinder, and they do this without any adjustment other than the spring pressure provided.

In the drawings making part of this specification, Figure 1 is an end view of piston and arrangement of parts, the piston-follower being left off to show more clearly the operating rings and springs, &c. Fig. 2 is a section through line *a b* of Fig. 1, showing the rings between the follower and flange, and the springs and saddle for expanding the packing-rings upon each side of the solid piston-supporting ring. Fig. 3 is a front view, enlarged, of the arrangement of springs and saddle, and manner of operating on the ends of the packing-rings. Figs. 4, 5, 6, 7, are views of packing-rings, showing their eccentricity and manner of cutting them apart, and the taper ends at their thicker side, also the solid piston-supporting ring having no eccentricity. Fig. 8 is a view of piston-follower.

Wherever the same letters and figures occur in different views they refer to the same parts.

In Figs. 1 and 2, A represents the piston-head; N, the piston-head flange; F, the circumference of piston-head, between the flange N and follower B; L, the small pin which holds the piston-head A to the piston-rod. C is the solid ring, which supports the weight of the piston on the bottom of its cylinder. D D' are eccentrically-bored packing-rings, split at their bottom and thicker side at P. G is the saddle for spreading the packing-rings D D' by the wedge-shaped ends. H H are the springs for forcing the taper or wedge-shaped ends of saddle G against the beveled ends Q of rings D D', for the purpose of spreading them apart with a constant spring-pressure and automatically. M M are the two set-screws in the circumference F of piston-head A, with their check-nuts R R to hold them in any required position. J is a pocket in piston-head A, for containing the springs H H and saddle G. I is a piece of metal for separating the springs H H from each other. B is the piston-follower, (shown in Figs. 2 and 8,) which is held in position by screws K K K K.

The operation of my improvement is as follows: The piston-head is placed in a cylinder of same diameter as the piston-head flange and follower, as near as may be, but with sufficient looseness to allow it to enter freely. The weight of the piston will naturally cause it to rest on the bottom of said cylinder. The looseness will then be all at the top of the piston, so that if steam were admitted it would pass from one side to the other. Packing-ring D is then placed on the piston-head around circumference F, and close to flange N, with its slotted side down, and the thin side at the top. The solid ring C is slipped on next, and then the other packing-ring D', in like manner to ring D. These rings are to be pushed close together, so that their sides, which are scraped to a fit, shall be in contact. Saddle G is then placed in its pocket J, with its tapering ends in contact with the beveled ends Q of rings D D', the saddle by its shape straddling solid ring C. Springs H H and separating-piece I are placed in position over the saddle G, so that they will bear against the top of pocket J and on saddle G, both springs being compressed suitably to exert radially a proper pressure on the top of saddle G, to force its taper ends against the beveled ends of rings D D', and spread said rings circumferentially, and press against the surface of cylinder with an elasticity which is adjusting to the wear automatically, to prevent leakage. The solid ring C, intermediate between rings D D', sustains the weight of the piston on the bottom of the cylinder. Against this ring are screwed the set-screws M M, through the circumference F of piston-head A, which raises or lowers the piston to a central position in the cylinder, and by this means said adjustment is at all times made as required, or as the ring C or the cylinder wears. The follower B is then screwed on as usual, by screws K K, &c., forcing the rings to close contact, and thereby preventing steam from entering within the piston.

Thus it will be seen that the two operations of packing against leak, and of centering the piston in its cylinder, are distinct operations, but the separate parts are so placed relatively to each other as to form a compact and steam-tight packing and adjusting device, operating together to accomplish jointly the ends sought for.

Having described my invention and its operation in the foregoing specification, I claim as my invention, and desire to secure by Letters Patent—

The combination, substantially as before described, of the flanged piston-head A, the follower B, two or more packing-rings and their expanding-wedges, with a solid piston-sustaining ring, in adjustable connection with the piston-head, but independent of the packing-rings, in the manner and for the purposes described.

H. WALKER.

Witnesses:
A. B. MACKENZIE,
WM. O. FLAVELL.